United States Patent
Kurukchi et al.

(10) Patent No.: US 6,210,583 B1
(45) Date of Patent: *Apr. 3, 2001

(54) SPENT CAUSTIC PRETREATMENT AND ENHANCED OXIDATION PROCESS

(75) Inventors: Sabah A. Kurukchi, Houston; Joseph M. Gondolfe, Cypress; Stephen Z. Masoomian, Houston, all of TX (US)

(73) Assignee: Stone & Webster Engineering, Boston, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,663

(22) Filed: Dec. 17, 1998

Related U.S. Application Data (60) Provisional application No. 60/075,886, filed on Feb. 25, 1998.

(51) Int. Cl.[7] .................................................. B01D 3/38
(52) U.S. Cl. .............................. 210/638; 203/45; 203/46; 203/75; 203/76; 203/78; 203/79; 208/317; 208/321; 208/337; 208/356; 210/760; 210/761; 423/183; 423/193; 423/551
(58) Field of Search ................................ 203/43–46, 75, 203/76, 78, 79, 92, 96; 208/311, 317, 321, 322, 337, 356, 363, 364; 210/634, 638, 639, 760, 761, 774; 423/181–183, 641, 193, 551

(56) References Cited

U.S. PATENT DOCUMENTS

| | | | |
|---|---|---|---|
| 5,244,576 | * 9/1993 | De Roeck et al. | 210/638 |
| 5,268,104 | * 12/1993 | Masoomain | 210/638 |
| 5,885,422 | * 3/1999 | Kurukchi et al. | 203/45 |
| 5,891,346 | * 4/1999 | Huntley | 210/761 |

* cited by examiner

*Primary Examiner*—Peter A. Hruskoci
(74) *Attorney, Agent, or Firm*—Akin, Gump, Strauss, Hauer & Feld, L.L.P.

(57) ABSTRACT

A process for pre-treating a spent caustic stream prior to oxidation which includes countercurrent multi-stage elevated temperature solvent extraction of dissolved organic material from the spent caustic using a solvent to yield a spent caustic raffinate containing only residual amounts of organic solute and steam distilling the spent caustic raffinate to remove the residual organic solutes, yielding a pretreated spent caustic stream substantially free of organic material which is then subjected to wet air oxidation and thereafter to ozonolysis to yield a wastewater stream having a low COD and BOD, which is neutralized to a pH of 8.5 to 9.0.

15 Claims, 4 Drawing Sheets

SPENT CAUSTIC PRETREATMENT AND ENHANCED OXIDATION PROCESS

CROSS REFERENCE TO RELATED APPLICATIONS

This application claims the benefit of provisional application U.S. Ser. No. 60/075,886 filed Feb. 25, 1998.

STATEMENT REGARDING FEDERALLY SPONSORED RESEARCH

Not applicable.

BACKGROUND OF THE INVENTION

1. Field of the Invention

This invention relates to a method for treatment of a spent caustic stream and in particular to treatment of the spent caustic stream for removal of organic contaminants to condition the caustic stream for more efficient and complete oxidation that better conditions the caustic stream for disposal.

2. Description of the Related Art

In the petroleum and petrochemical industries it is common to scrub gas mixtures that contain acid gas components, such as carbon dioxide ($CO_2$) and hydrogen sulfide ($H_2S$), to remove these components from such gas mixture before it is used for further processing purposes or otherwise disposed of as by venting to the atmosphere. An aqueous sodium hydroxide solution—i.e., a caustic solution—is commonly used for scrubbing of such gas mixtures. By reaction with the caustic solution, i.e. NaOH, acid gas components such as hydrogen sulfide and carbon dioxide are converted into sodium sulfide ($Na_2S$), sodium hydrosulfide (NaHS), sodium carbonate ($Na_2CO_3$) and sodium bicarbonate ($NaHCO_3$) which carry into the sodium hydroxide (NaOH) solution. Wherein the gas mixture to be scrubbed also contains hydrocarbon components (particularly $C_4$, $C_5$ and higher molecular weight hydrocarbon) a portion of these hydrocarbon components also pass as such into the aqueous sodium hydroxide stream, each to the limit of its mutual solubility in solution.

One type of petrochemical operation wherein an aqueous sodium hydroxide solution is almost invariably used for gas scrubbing is in an ethylene production unit. In an ethylene production unit a saturated aliphatic hydrocarbon feed, such as ethane, propane or higher molecular weight hydrocarbon mixtures such as naphtha, atmospheric and/or vacuum gas oil, and the like, is heated at high temperatures in the presence of steam to crack the saturated hydrocarbon molecules down to lower molecular weight unsaturated hydrocarbons such as ethylene predominately, followed by propylene, and then various quantities of $C_4$, $C_5$ and $C_6$ mono- and diolefinic hydrocarbons, with a lesser quantity of $C_7$ and higher molecular weight saturate and unsaturate aliphatic, alicyclic and aromatic hydrocarbon. During steam cracking, any sulfur containing compounds present in the hydrocarbon feed stream are converted into hydrogen sulfide and/or organically bound sulfur compounds and also a content of carbon dioxide is generated in the cracked gas mixture by the water gas shift reaction. The resultant gas mixture from steam cracking is then quenched to a lower temperature of from about 35 to 40° C., whereupon the major portion of its water and $C_7$ hydrocarbon content is condensed and separated from said gas mixture. After quenching, the remaining constituents of the gas mixture are conditioned by various steps of gas compression and refrigerative cooling to prepare it for cryogenic distillation whereby its ethylene, propylene and butenes contents will ultimately be recovered in essentially pure form for ultimate use as monomers in the production of various polymers, such as polyethylene, ethylene copolymers, polypropylene and the like.

One step required to properly condition the cracked gas prior to its cryogenic distillation is to scrub the cracked gas essentially free of any acid gas components, such as hydrogen sulfide and carbon dioxide. This is accomplished at some interstage location of a multi-stage gas compression system and, on occasion post-compression, wherein the cracked gas stream is at a pressure from about 10 to about 30 atmospheres (atm) by contacting the compressed cracked gas stream with an aqueous sodium hydroxide solution by countercurrent contact in a gas-liquid contact vessel often referred to as an "absorber" or "scrubber."

The aqueous sodium hydroxide solution after such gas scrubbing contact is referred to as a "spent caustic solution" and contains, in addition to sodium hydroxide, the sodium sulfide, sodium hydrosulfide, sodium carbonate and sodium bicarbonate that results from the removal of acid gas compounds from the so scrubbed cracked gas stream and also a significant content of dissolved aliphatic, mono- and di-olefinic, as well as cyclic hydrocarbon and various carbonyls, styrenics and other organic contaminants. In this condition the spent caustic stream presents various problems with respect to its environmental disposal. For example, polymers tend to form in the spent caustic solution as long as the solution contains dissolved polymer precursors at an elevated temperature. Aldol condensation of dissolved oxygenated hydrocarbons (carbonyls, such as aldehydes and ketones) produces polymeric products that are commonly referred to as a "red oil," which is and remains partially soluble in a spent caustic solution that issues from the caustic scrubbing tower. Certain highly unsaturated hydrocarbons in the cracked gas, such as acetylenes and dienes (diolefinic hydrocarbons), that pass into the caustic solution in the scrubber may undergo addition type polymerization to various degrees., even to the point of a molecular weight which renders certain polymer species insoluble in the spent caustic solution such that they precipitate out of solution together with the aldol condensation polymers and may be removed from the spent caustic stream in a deoiling drum. In any event, the spent caustic solution removed from the scrubber, even following a deoiling drum treatment, contains in dissolved form a content of such condensation and addition types of prepolymer and polymer species which may later precipitate from the caustic solution as foulants of equipment surfaces that are later exposed to the spent caustic solution. From a disposal standpoint the sodium sulfide, sodium hydrosulfide contaminants as well as the dissolved hydrocarbon and other organic contaminants impart to the spent caustic stream too high of a chemical oxygen demand (COD) and/or biological oxygen demand (BOD) to allow for its environmentally acceptable disposal.

Accordingly, to reduce its COD and/or BOD, spent caustic streams are commonly subjected to an oxidation process to oxidize its organic contaminants and to oxidize its sulfide salts content to at least thiosulfates, and preferably to their highest oxidation state compounds. Such oxidation processes include wet air oxidation ("WAO") processes wherein an oxygen containing gas, such as air, is contacted with spent caustic at an elevated temperature in a contacting column. In this context, the dissolved hydrocarbon prepolymer and polymer contaminants in the spent caustic cause major problems, particularly with respect to spent caustic streams issuing from the operation of an ethylene production unit. Specifically, heat exchanger surfaces and other interior working surfaces, such as in transfer lines and valves, in a WAO process that are exposed to direct contact with the spent caustic undergoing WAO treatment tend to become clogged and fouled with polymeric materials over time, which necessitates periodic shutdown and cleanup of the WAO unit. Therefore, it is desirable to first free the spent caustic from dissolved polymers and polymer precursors if polymer formation and fouling of a WAO unit is to be avoided.

Proposals have been set forth in the art for methods of pretreating the spent caustic, prior to its oxidizing treatment, that are intended to reduce this fouling problem. For example U.S. Pat. No. 5,268,104 proposes to first contact an ambient temperature spent caustic with gasoline in a mixing drum and then separate the spent caustic from the gasoline in a deoiling drum after which the spent caustic, from which 70–100% dispersed oil has purportedly been removed, is oxidized with an air/ozone mixture. Even so, in practice a spent caustic pretreated by this mixing drum-deoiling drum technique has still been found to present a fouling problem to the equipment surfaces of post-treatment units. U.S. Pat. No. 5,244,576 by DeRoeck et al. proposes a somewhat more elaborate method for contacting a spent caustic stream with a recirculating stream of pyrolysis gasoline in order to remove prepolymer and polymeric hydrocarbons from the spent caustic prior to its treatment in a WAO unit. DeRoeck Patent '576 proposes to reduce polymeric fouling of the operating surfaces of a wet air oxidation unit by first intimately contacting spent caustic solution for a prolonged contact time with a recirculating volume of a pyrolysis gasoline as solvent to remove polymerizable hydrocarbon, particularly partial polymers, from the spent caustic. As described, the solvent is recirculated to the contacting vessel containing spent caustic at a rate of from 0.5 up to 10 times the volume rate of spent caustic under conditions that provide for a contact residence time of 10 to 20 minutes. Further, as the solvent is recirculated there is continuously both removed a take-off cut of solvent for solvent recovery and added a makeup quantity of fresh solvent, both in similar volumes, such that the volume ratio of fresh make-up solvent to spent caustic is about 1 to 100. Intimate contact of solvent with spent caustic is accomplished by the agitation created by the forced recycle of solvent using jet mixers or spray nozzles or by a mechanical stir. The vessel for contact may be subdivided, or a series of contact vessels may be utilized, to provide for multiple mixing stages or even a series of static mixers.

The procedure described by DeRoeck '576 is believed to be the state of the art pretreatment for spent caustic, achieving a significantly better removal of prepolymer and polymer organics from a spent caustic than simple mixing drum-deoiling drum treatment as described in U.S. Pat. No. 5,268,104. Therefore, the DeRoeck '576 procedures extend the operating time before polymer fouling requires shutdown and cleanup of the WAO unit. However, it has been found in practice that polymer fouling still presents a substantial problem with a spent caustic pretreated by the DeRoeck '576 procedure.

There is needed a still better, more efficient method for the treatment of a spent caustic stream to eliminate from it those contaminants which are objectionable from a standpoint of either its proper disposal or subsequent treatment to further condition the spent caustic for its safe disposal. Further, there is a need for a procedure for the oxidation of a spent caustic to higher conversion of sulfides to sulfates than can be economically achieved by wet air oxidation alone, in order to still further reduce the COD and BOD of the spent caustic before its disposal.

SUMMARY OF THE INVENTION

The present invention provides a process for removing substantially all organic material from a spent caustic stream. That is, treatment of a spent caustic in accordance with the method of this invention will reduce its content of organic contaminants to a level less than 50 ppm. Moreover, the two primary functional groups of contaminants being (1) conjugated dienes (e.g., R—C=C—C=C—R) and (2) carbonyls (e.g., R—CH=0) may be reduced by this invention to concentrations approaching less than 10 ppm and nil, respectively.

In treating a spent caustic having a quantity of organic material dissolved in it, a wholly fresh or virgin water-immiscible organic solvent is intimately mixed by counter-current flow with the spent caustic in a multi-stage liquid-liquid extractor wherein both fluids during their contact are at a temperature above ambient but preferably below 100° C. In this highly efficient extraction unit diolefin hydrocarbon (diene) contaminants are removed from the spent caustic to a level of 20 ppm or less. There is, however, a finite solubility of the organic solvent in the spent caustic. To remove this content of residual organic material from the extracted spent caustic, the spent caustic, as raffinate from the solvent extractor, hereafter being referred to as "spent caustic raffinate," is subjected to steam distillation. The spent caustic raffinate enters the top of a steam stripping tower. The raffinate flows downward through the tower into a kettle-type reboiler, which produces steam out of the water content of the caustic raffinate. The steam flows upward in the tower, and by altering the partial vapor pressure of the residual organics in the spent caustic raffinate, the steam removes residual organic material from the spent caustic raffinate stream. A pretreated spent caustic stream is thus provided that is substantially free of organic contaminants including monomeric polymer precursors. The pretreated spent caustic stream can be suitably conditioned for disposal in an environmentally acceptable manner, such as by oxidation of inorganic sulfur compounds, and disposed of as a waste stream.

The organic solvent employed in the counter-current, multi-stage contact extraction of the spent caustic is a "virgin" solvent in the entirety of its volume used. That is, with respect to any volume of solvent which first comes into contact with a volume of spent caustic, no portion of this solvent volume has previously been in contact with a prior portion of spent caustic without also having first been completely regenerated to its virgin state by distillation. In other words, each volume of organic solvent supplied to the extraction column is either passed through one time only or, if reused, is first completely regenerated to the extractive capacity of a virgin organic solvent. This condition is essential to achieving an essentially nil level of dissolved $C_{4-5}$ diolefins—i.e., less than 20 ppm total dienes—in the spent caustic raffinate. Another necessary condition to achieve this essentially nil level of dissolved diolefins is that the solvent and spent caustic must be brought into counter-current contact while each is at an elevated temperature, that is a temperature significantly greater than 25° C. and up to 100° C., preferably while each is at an initial column input temperature of from 35° C. to about 100° C.

It has been found that the contact and mixing of a spent caustic stream with a water immiscible solvent substantially removes $C_4$ and $C_5$ diolefinic and carbonyl constituents from the spent caustic solution under the following conditions. The solvent should have a lower density and surface tension than the spent caustic stream. Flow should be countercurrent under agitation and in multiple contact stages. Both the spent caustic stream and the solvent should be at greater than ambient temperature. Processes heretofore either did not contemplate that $C_4$ and $C_5$ diolefinic and carbonyls constituents existed, or the processes did not remove these components from a spent caustic stream to any substantial extent. This substantial removal of $C_4$ and $C_5$ diolefin and carbonyl constituents occurs concomitantly with the removal of other organic contaminates and troublesome oxidation retardants, such as phenols and prepolymer and polymeric constituents, from the spent caustic.

A preferred extraction solvent is one rich in aromatics such as benzene, toluene and/or xylenes. To the extent that the spent caustic contains like aromatic constituents as contaminants, these will not be removed by the solvent extraction and may even be somewhat enriched in the spent caustic raffinate. However, given that the spent caustic raffinate is now of a low and/or essentially nil content of $C_4$ and $C_5$ diolefin and carbonyl constituents, the spent caustic raffinate may be subjected to steam stripping without concern for fouling the steam stripper operating surfaces by polymeric materials. The spent caustic raffinate may be steam stripped at subatmospheric, near atmospheric or superatmospheric pressure at bottom column reboil temperatures of from about 110 to about 130° C. or greater to remove residual aromatic constituents and further reduce the already low level of residual diolefins or other organics. All of which contaminants are taken off in the vapor overhead product of the steam stripper column.

The steam distilled caustic raffinate taken as a bottom product from the steam stripping tower, hereafter referred to as the "pretreated" caustic stream, will contain a total quantity of organic constituents which is on the order of less than 50 ppm and diene content less than 20 ppm and generally less than about 10 ppm. To the extent that the organic content of the spent caustic stream constituted a source of polymeric fouling of the working surfaces of a WAO unit, the pretreated caustic stream presents no such problem. Further, it has been found that the pretreated caustic stream is more efficiently oxidized by a WAO process than would have been the case in the absence of pretreatment by the process of this invention. More specifically, wet air oxidation under conventional conditions of time, temperature and pressure will substantially eliminate from a pretreated caustic stream all sodium sulfide, converting from about 70–80% of same to sodium sulfate with the balance converted to sodium thiosulfate; compared to conversions of 40–50% for a non-pretreated caustic stream.

To further reduce the COD and BOD values of the wet air oxidized pretreated spent caustic, it may be subsequently subjected to ozonolysis in a two-section ozonolysis reaction vessel comprising a bottom liquid accumulator bubble section and a top packed liquid-vapor contact section. The oxidized spent caustic from the WAO unit is fed to the top section and an oxygen/ozone containing gas mixture is fed to the bottom section of the ozonolysis reaction vessel. The bottom liquid accumulator bubble section provides sufficient liquid residence time for conversion of residual oxidizable components so, based on initial sodium sulfide content of the spent caustic, an overall conversion of no less than 90% to sodium sulfate may be achieved. The top packed liquid-vapor contact section aids in this conversion while also acting to prevent ozone breakthrough to the vent gases from the ozonolysis reaction vessel.

Following ozonolysis the so oxidized caustic stream is preferably subjected to a multi-stage neutralization treatment through a series of two or more stirred tank reaction vessels whereby, through the time controlled addition of progressive portions of acid reagent, the pH of the oxidized caustic stream is reduced, preferably to from about 8.0 to 9.0 and more preferably about 8.5 to 9.0, while avoiding the generation of toxic $H_2S$ gas from a temporary acid over dosing or from over-consumption of acid reagent.

BRIEF DESCRIPTION OF THE DRAWING

A better understanding of the present invention can be obtained when the following detailed description is considered in conjunction with the figures.

DETAILED DESCRIPTION OF THE PREFERRED EMBODIMENT

The present invention is directed to the treatment of spent caustic from any process which generates a spent caustic stream containing hydrocarbons or other organic material. Caustic soda, namely sodium hydroxide, in the form of a aqueous sodium hydroxide (caustic) solution is used to react and thereby remove acid gases such as carbon dioxide, hydrogen sulfide, mercaptans, carbon disulfide and other sulfur-containing compounds from various process streams in the petroleum, petrochemical and metals industries. For example, in an ethylene production unit, sulfur compounds are removed from cracked gas streams by absorption using an aqueous caustic stream (i.e., a solution typically of about 10 wt % sodium hydroxide). After absorption, the aqueous caustic stream is referred to as a spent caustic stream, and this spent caustic stream requires treatment to render it suitable for disposal in an environmentally acceptable manner.

To ready it for proper disposal, spent caustic can be oxidized to reduce its COD and/or BOD and neutralized to an acceptable pH level for disposal as a waste water stream.

It is desirable to remove as completely as possible any organics contained in the spent caustic stream prior to its oxidation. The present invention provides a process for removing organic contaminants, particularly dienes, from a spent caustic stream down to a negligible level prior to its oxidation treatment. Removal of organics from the spent caustic improves oxidation efficiency because these materials include prepolymers, polymers and polymer precursors which, over time, foul downstream equipment causing severe problems such as reduced heat exchange efficiency and equipment plugging. Further, it has been found that prior removal of light organics, particularly the $C_4$ and $C_5$ diolefins, to a negligible level of about 20 ppm or less significantly improves the efficiency of wet air oxidation processes for eliminating from a spent caustic its sodium sulfide content by conversion of same to mainly sodium sulfate with the balance converted to sodium sulfites and thiosulfates. This enhanced level of wet air oxidation of a pretreated spent caustic then renders it economically feasible to further advance the state of oxidation of the sulfur salt content in a caustic stream by a subsequent ozonolysis treatment.

The method of this invention comprises, as a first general step, the counter-current flow of a spent caustic in multiple contact stages at an elevated temperature with an immiscible organic solvent to yield a (caustic) raffinate having an essentially negligible content of carbonyls, and $C_4$ and $C_5$ diolefins, and as a second general step, the steam distillation of the caustic raffinate to remove from it essentially all aromatic constituent contaminants with a further reduction in the level of any residual organics, carbonyls, and $C_4$ and $C_5$ diolefins to yield a pretreated caustic stream having essentially negligible total organic content. By a negligible total organic content, it is meant that the pretreated caustic stream has less than 50 ppm total organics and a diene content of 20 ppm or less and generally less than 10 ppm of diene content. As a third general step, the pretreated caustic stream is subjected to wet air oxidation (WAO), a low pressure wet air oxidation (LPWAO) process being preferred, followed by ozonolysis by both liquid-bubble and liquid-vapor contact in a two-section ozonolysis contactor vessel. Upon completion of this third general step, based upon the initial content of sodium sulfide in the spent caustic, in the twice oxidized caustic stream that results, 90% or greater of this initial sodium sulfide content will have been converted to sodium sulfate and the chemical oxygen demand (COD) will have been reduced by more than 95% from the initial level of the spent caustic. As a fourth general step, which is optional but preferred, the so twice oxidized caustic stream is subjected to multi-stage neutralization by progressive addition of controlled portions of an acid reagent through a series of stirred tank reactors to reduce its pH value to a final value in the range of 8.5–9.0. Multi-stage neutralization has been found to reduce consumption of acid reagent and avoid the generation of toxic $H_2S$ gas due to inadvertent time-localized acid overdosing.

As processed through the first three general steps of this process, a spent caustic stream is conditioned to be non-problematic with respect to causing polymeric fouling of the working surfaces of the operating equipment of the oxidizing process. The spent caustic stream is more efficiently and completely oxidized to have the lowest final COD and BOD values, and it is most amiable to environmentally sound disposal after neutralization of its alkaline values to an acceptable pH value for disposal as waste water.

The solvent for the first step extraction of spent caustic is preferably am organic liquid, particularly a hydrocarbon liquid, that is a readily available stream within the battery limits of the plant which produces a spent caustic stream. Further, the preferred solvents for use are those of a high content of aromatics, particularly toluene. Aromatics, or hydrocarbon streams rich in aromatic content, have been found to have a good selectivity for extracting organic solutes, particularly $C_{4-5}$ diolefin hydrocarbon solutes, from a spent caustic while also having a relatively small density difference and interfacial tension relative to spent caustic. Such solvent characteristics provide for ease of distribution within and a minimum of shear thinning between the solvent and spent caustic in the counter-current flow contact extraction tower.

Figure 1:
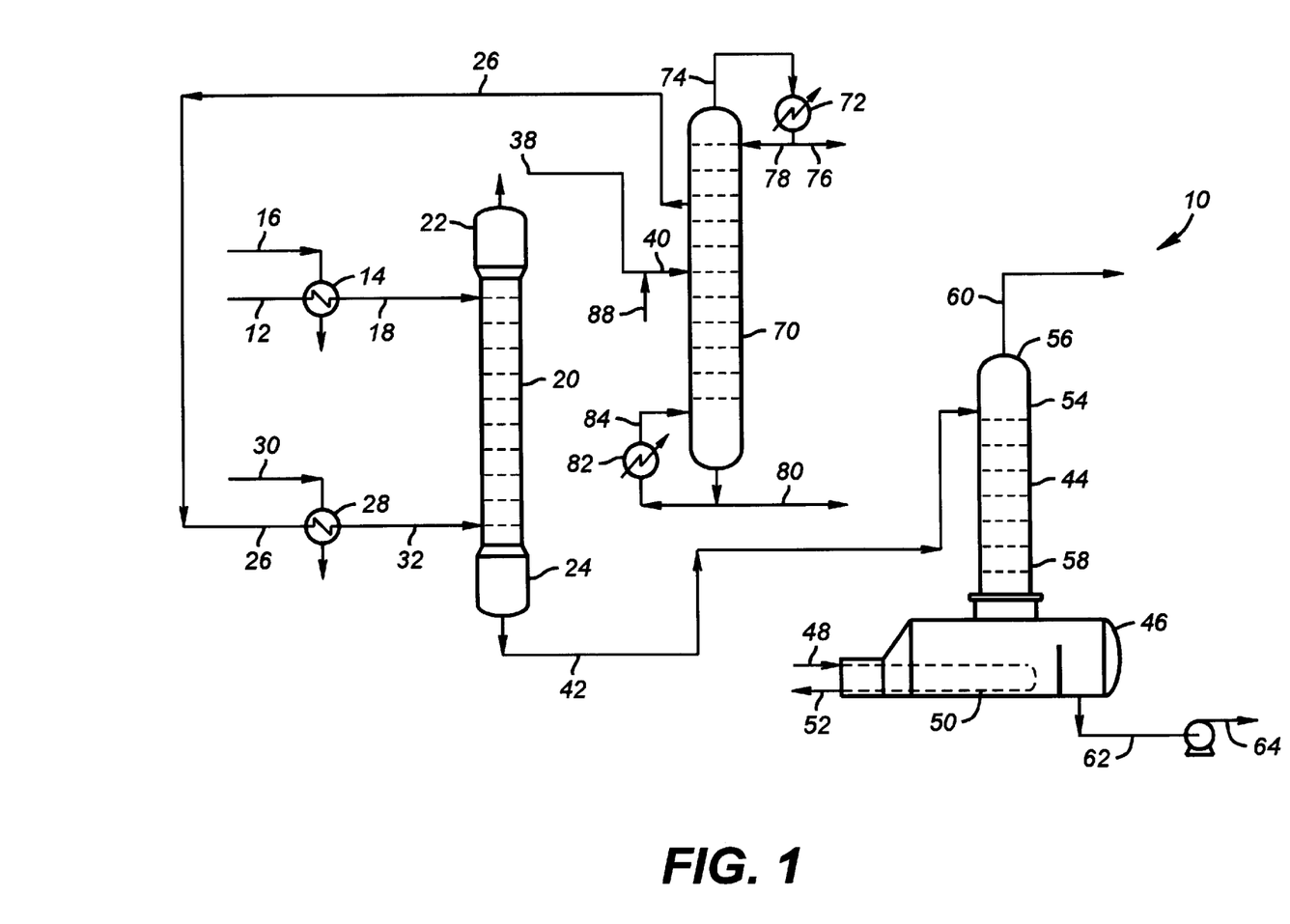
FIG. 1 is a schematic illustration of a spent caustic pretreatment process according to the present invention wherein the extraction solvent is recovered, regenerated to a virgin state and recycled to the extraction tower, with provision for addition of solvent make-up as necessary.
Figure 2:
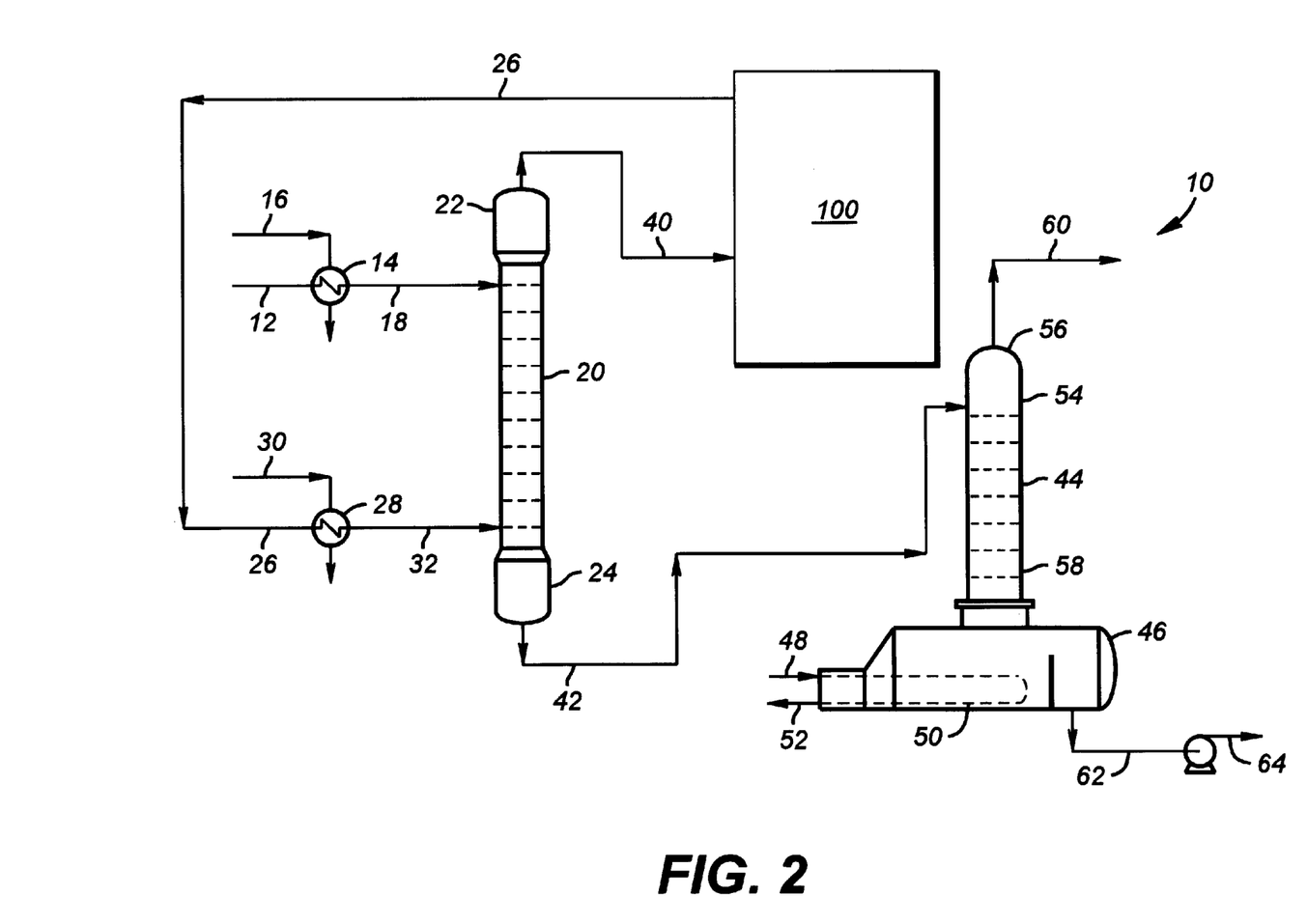
FIG. 2 is a schematic illustration of a spent caustic pretreatment process wherein the extraction solvent is taken as a cut of a hydrocarbon stream otherwise available within the battery limits of a plant operation which generates the spent caustic stream, is passed once through the extraction tower and thereafter this spent solvent is returned to the processing unit of the plant from which it was first taken.

Within the battery limits of a refinery operation, a toluene stream as such may be readily available for use, and when so this toluene stream would be the preferred source for the solvent. In this context, such portion of that toluene stream as is used for solvent purposes may be used on a single pass basis and upon its recovery from the extractor column of this process this quantity of now spent toluene may be returned as feed to the toluene distillation column of the production facility—as generally illustrated by FIG. 2. In other situations, such as an ethylene production unit wherein a toluene stream as such is not typically available, one may import a stock of toluene and operate the extraction step with a toluene solvent regeneration and recycle loop as generally illustrated in FIG. 1. Alternatively, in an ethylene production unit there is typically available as a process stream a fully hydrogenated pyrolysis gasoline stream, and such a stream is rich is aromatic constituents—namely, benzene, toluene, mixed xylenes and others. This fully hydrogenated pyrolysis gasoline stream may be used as a source for the extraction solvent on a single pass basis and then the spent gasoline solvent returned to the production still for pyrolysis gasoline within battery limits of the ethylene production unit—again, as generally illustrated by FIG. 2—or with a solvent regeneration and recycle loop as generally illustrated in FIG. 1.

As before noted, to achieve in a caustic raffinate stream an essentially negligible content of $C_4$ and $C_5$ diolefins, it is critical to bring a virgin extraction solvent into counter-current flow contact with spent caustic through multiples contact stages while both fluids are at a greater than ambient temperature. The multi-stage countercurrent extraction of the spent caustic may be performed in a variety of equipment designs. A multi-stage rotary bucket extractor (known as a Graesser extractor), wherein a horizontal drum is filled with stratified settling liquids and a series of buckets revolving around the inner periphery pick up the liquids and releases them as rain droplets of one liquid through the other, may be employed. Likewise, agitated liquid-liquid column contactors, such as a Scheibel baffle column, a Kuhni column, a Rotating Disc contactor, an Oldshue-Ruston column or a Karr reciprocating plate contactor, may be employed.

Unless overhead space is limited within the unit perimeter, a vertical agitated liquid-liquid column contactor is preferred. Preferably, a vertical contacting tower is employed wherein a spent caustic stream of a somewhat elevated temperature is fed to the tower proximate to its upper end while the immiscible solvent at an elevated temperature is fed to the tower proximate to its lower end. The heat content provided by the spent caustic stream and the virgin extraction solvent stream feeds to the extraction column is such that, preferably, the temperature of both liquids during contact within the tower will be at least 50° C., and more preferably 70° C. or greater. Preferably, this will be accomplished by supplying such heat content as much as possible through the temperature at which virgin extraction solvent is fed to the extraction column, with the balance of the required heat content supplied by the temperature of the spent caustic stream fed to the top of the extraction tower. This means that it is preferred to operate in a feed mode to the extraction tower wherein the highest practical temperature of solvent feed is used to enable the lowest temperature as is practical for that of the spent caustic stream feed, consistent with the desired extraction column operational temperature of operation of 50° C. or greater, and more preferably, of 70° C. or greater. Internal of the contact tower there should be plates or trays that are preferably perforated and most preferably these perforated trays/ plates are mechanically affixed to means by which they can be reciprocated, circulated, or otherwise moved within the tower by a motive means.

By reason of its greater density, the spent caustic fed to the top of the extraction tower will move toward the tower bottom while the bottom feed solvent is displaced toward the upper portion of the extraction tower. During this transposition of the immiscible liquids, they are brought into intimate contact by both the agitation of their movement around, about, and through the perforations of column trays/plates and also by the frequency of the reciprocation, circulation or movement of these perforated trays/plates within the extractor column.

The intimacy of spent caustic-solvent contact caused by this counter-current agitated flow contact mixing, together with the maintenance of a gradient difference in solute concentration between spent caustic and solvent; as between the top column solute full spent caustic-top column solute fat solvent versus bottom column solute depleted caustic-bottom column virgin solvent; which is caused by the counter-current nature of the fluid flows secures the maximum possible extraction of carbonyls, $C_4$ and $C_5$ diolefins and other heavy organic solutes from the spent caustic into the immiscible extraction solvent for the given temperature chosen for operation of the column.

As also previously noted, the temperature at which this intimate contact between spent caustic and immiscible extraction solvent is secured also critically bears on the degree of solute extraction achieved and hence the quantity of residual organics, particularly $C_4$ and $C_5$ diolefins, that will be left remaining in the caustic raffinate, and hence the final treated caustic stream. Ambient temperature contacting, however intimate may be the caustic-solvent contact, is an insufficient condition to achieve a relatively negligible content of diolefins in the caustic raffinate or in the final treated caustic stream. Instead, it has been found that both contacting fluids must be at the time of their contact at least 10° C. above ambient (i.e. 25° C. is ambient), and preferably 25° C. above ambient; namely, the temperature of the fluids during contact within the extraction tower should not be less than 35° C., and preferably not less than 50° C. and more preferably in the range of 70° C. to 90° C. The maximum temperature which either feed stream may be heated should not exceed the boiling point of that feed stream composition at the pressure at which the extraction column is operated.

Also, the rates of feed to the extraction column, as this bears upon the residence time of contact within the column and ratio of solvent to spent caustic feed, bears upon the ultimate efficiency of the extraction of $C_4$ and $C_5$ diolefins from the spent caustic. Generally, it is desirable that the volume ratio of solvent to spent caustic feed be at least 1:1, more preferably 1.5:1 to about 2:1.

As a bottom product take-off, the extraction column yields a caustic raffinate which contains a quantity of $C_4$ and $C_5$ diolefins of less than 30 ppm and preferably less than 15 ppm. This compares to a typical content in a spent caustic from an ethylene production unit for such $C_4$ and $C_5$ diolefin constituents of from about 1000 ppm to about 1500 ppm. With such negligible quantities of highly reactive $C_4$ and $C_5$ diolefins, together with the elimination from the caustic raffinate of prepolymers and polymeric organics, the caustic raffinate may be steam distilled without concern for fouling the steam distillation unit with polymeric foulants.

Since the extraction solvent, particularly if one of high aromatic content, may not extract aromatic constituents from the spent caustic and instead may actually add aromatic constituents to that spent caustic that becomes the caustic raffinatew stream; to reduce the level of aromatic constituents in the caustic raffinate it is necessary to steam distill the caustic raffinate.

Turning now to FIG. 1, a spent caustic pretreatment process 10 with a solvent regeneration and recycle loop is illustrated schematically. In an ethylene plant, for example, an aqueous caustic stream is used to scrub acid gases containing carbon dioxide and sulfur compounds from a hydrocarbon stream. After gas scrubbing, in addition to containing inorganic alkali salts, the caustic stream, now a spent caustic stream, also contains organic compounds such as light and heavy hydrocarbons, polymers and polymer precursors. The present invention in one aspect is directed to the essentially complete removal of these organic compounds. A feed spent caustic stream 12 containing these organic compounds is fed to spent caustic pretreatment process 10. Feed spent caustic stream 12 is preheated to an appropriate temperature in a heat exchanger 14 by steam 16 to produce a heated feed spent caustic stream 18, which is fed into an extractor 20.

Extractor 20 is a multi-stage countercurrent plate-type liquid-liquid extraction vessel. Extractor 20 has an upper end 22 and a lower end 24, and spent caustic stream 18 is introduced proximate to upper end 22. Spent caustic stream 18 flows downward through extractor 20.

A feed solvent stream 26 is preheated to an appropriate temperature in a heat exchanger 28 by steam 30 to produce a heated feed solvent stream 32. Heated feed solvent stream 32 is fed to extractor 20 near lower end 24 for flow upward in extractor 20. Spent caustic 18 has a higher density than feed solvent 32, so spent caustic 18 flows downward through extractor 20 while solvent 32 is displaced upward through extractor 20. Internal components in extractor 20 provide intimate mixing as assisted by a reciprocated, circulated or other movement of these internal components, between the feed spent caustic stream 18 and the feed solvent stream 32 during the juxtaposition of these feed streams through the column. In upper end 22 solvent 32 separates from spent caustic 18 and flows overhead as a solvent extract stream 38. At lower end 24 spent caustic 18 separates from feed solvent 32 and flows out of lower end 24 as a spent caustic raffinate stream 42.

Feed spent caustic stream 12 from the ethylene plant (not shown) contains primarily sodium carbonate, sodium hydrosulfide and sodium sulfide in water but is also contaminated with light hydrocarbons, polymers, polymer precursors and heavy hydrocarbons. Feed solvent 26 is selected to provide sufficient solubility for these organic compounds so that extractor 20 removes essentially all of diolefinic contaminants and prepolymer, polymeric and aliphatic hydrocarbon constituents from feed spent caustic stream 18 to produce spent caustic raffinate stream 42 of an essentially negligible diene content. While feed spent caustic stream 12 may contain up to 1000 or greater parts per million (ppm) polymerizable organics precursors, spent caustic raffinate stream 42 has only a residual amount of these organic precursors, less than 30 and typically less than 10 ppm. Because these organic precursors are much more soluble in organic feed solvent stream 32 than in aqueous feed spent caustic stream 18, the organic precursors diffuse under elevated temperature contact into the solvent to produce solvent extract stream 38. Thus, extractor 20 provides a mass transfer operation for removing organic contaminants from feed spent caustic stream 18.

Extractor 20 and feed solvent 32 are sized to provide sufficient extraction capacity so that spent caustic raffinate stream 42 contains only a minimal residual amount of polymerized or polymerizable organic material. One skilled in this art upon consideration of the quantity of spent caustic and the amount of organic material particularly contained therein may determine the amount of solvent required, as well as the size and number of theoretical mixing stages required for extractor 20 to produce a spent caustic raffinate stream 42 essentially free of diene and other organic polymer precursors. By feeding the solvent into extractor 20 near the outlet for the spent caustic raffinate, the concentration gradient between organic solutes in the spent caustic and in the solvent is maximized along the lines of flow of the immiscible liquids within the column. This provides the greatest driving force for the organic solutes to diffuse from the spent caustic into the solvent.

Although removal efficiency of organic polymer precursor solutes in extractor 20 is high, spent caustic raffinate stream 42 nevertheless becomes saturated with nonpolymerizable hydrocarbon components from the extraction solvent. To further reduce the quantity of organic solutes or dissolved hydrocarbon and organic material, spent caustic raffinate stream 42 is steam-distilled in a steam distillation unit 44 to remove the organic solutes.

Steam distillation unit 44 has a kettle-type reboiler 46 which is heated by steam 48 in a tube bundle 50 producing a condensate 52. Steam distillation unit 44 has a steam distillation tower 54 which has an upper end 56 and a lower end 58 attached to reboiler 46. Spent caustic raffinate stream 42 is fed to steam distillation tower 54 proximate to upper end 56, the aqueous caustic flowing downward while the organic solutes are vaporized by steam flowing upward. The organic solutes are removed from the spent caustic according to steam distillation principles and flow upward in tower 54. Heat provided by steam 48 boils the water in spent caustic raffinate stream 42 providing water vapor in steam distillation tower 54 for altering the partial vapor pressure of the organic solutes in the vapor phase and carrying the organics upward, thus allowing a hydrocarbon purge 60 to be discharged from upper end 56 of steam distillation tower 54,. A pretreated spent caustic stream 62 is withdrawn from reboiler 46 by a pump for further routing by line 64. Pretreated spent caustic stream 62 has a negligible amount of organic solutes in it, typically less than 50 ppm. Pretreated spent caustic stream 62 typically contains less than 10 ppm of polymerizable organic solutes.

FIG. 1 also illustrates a loop for regeneration of spent solvent to a virgin solvent state for recycle use. Solvent extract stream 38 and a fresh solvent (make-up) stream 88 are combined and routed by line 40 to a solvent regenerator 70. Solvent regenerator 70 is a conventional trayed distillation tower having a partial condenser 72 on an overhead stream 74. A light ends stream 76 is purged from solvent regenerator 70, and a reflux 78 is returned to the column. A heavy ends stream 80 is purged from solvent regenerator 70 for removing heavy organic material, such as polymeric material, from solvent extract stream 40. A reboiler 82 provides heat input to solvent regenerator 70, returning a reboiler stream 84 to the column. A solvent recycle stream 26 is taken as a heart-cut side stream from solvent regenerator 70. Fresh solvent make-up stream 88, to maintain a constant solvent volume balance, may be added to recycle stream 26 but is preferably added to the solvent extract stream 38 that is fed by line 40 to solvent regenerator 70. In this way any heavy weight tails that may exist in the portion of fresh make-up solvent 88 will pass to and out with the heavy ends stream 80.

Spent caustic pretreatment process 10 is particularly useful for the removal of dissolved hydrocarbons and heat-sensitive polymer precursors such as may be found in a spent caustic stream from an ethylene production unit. While a conventional spent caustic treatment system may include simple deoiling of the spent caustic to remove heavy organics and/or steam stripping, operated at near atmospheric pressure, to remove light organics from the spent caustic, spent caustic pretreatment process 10 provides more complete removal of the organic material found in the spent caustic stream.

FIG. 2 illustrates a spent caustic pretreatment process 10 wherein the extraction solvent 26 is taken as an available hydrocarbon stream from an existing process stream within the battery limits of a plant 100 and is utilized on a one-pass basis through extractor 20 and recovered as a solvent extract stream 40 which is then returned as feed stock to the unit of plant 100 which generated the hydrocarbon stream which was drawn upon as the solvent source. Otherwise, operation of extractor 20 to produce caustic raffinate 42 which is then steam distilled in distillation unit 44 to produce pretreated spent caustic 62 is like that discussed with respect to FIG. 1 wherein like items of equipment and their operations are similarly numbered for purposes of reference. Pretreated caustic stream 62 may be routed via line 64 to a wet air oxidation (WAO) unit as feed and there oxidized without posing any problems of fouling to the WAO unit. On the one hand, in a conventional spent caustic treatment system, most of the polymer precursors remain in the spent caustic causing severe fouling of the stripper reboiler resulting in frequent unit shutdowns for reboiler and stripper column cleaning, or in the absence of a steam stripper, fouling of the WAO unit results in a similar need for shut down and clean up. On the other hand, spent caustic treatment process 10 removes heavy organics and polymer precursors by purging these organics through heavy ends stream 80 from solvent regenerator 70 as in FIG. 1, or passing these organics in the spent solvent stream returned to plant 100 as in FIG. 2. Thus fouling in the stripper reboiler is avoided resulting in fewer unit shutdowns for reboiler and stripper column cleaning.

Following steam stripping, the pretreated caustic stream is now imminently suited to processing by a WAO unit without consequences of polymeric fouling of the working surfaces of the WAO unit. Further, it has been found that the pretreated caustic stream undergoes a more efficient wet air oxidation than does a spent caustic stream which has not been subjected to a pretreatment in accordance with this invention. The details and mechanics of wet air oxidation are well known to those skilled in the art and need not be described in detail herein. The efficiency of any WAO unit, whether one of a high pressure-temperature, medium pressure-temperature or low pressure-temperature design, will be enhanced by pretreatment of the spent caustic stream as previously described. Of particular benefit from spent caustic pretreatment by this invention is the efficiency of a low pressure wet air oxidation (LPWAO) unit.

In this respect, a pretreated caustic stream may be oxidized by wet air oxidation at an operating pressure of less than or equal to about 7 atmospheres gauge and an operating temperature of equal to or less than about 145° C. in a multiple-stage, series, vertical co-current reactor having sintered metal air spargers and provisions for interstage live steam injection. Within residence times now normal and typical for wet air oxidizer operations (i.e., from about 3 to about 12 hours), in an LPWAO essentially all sodium sulfide of the pretreated caustic stream is converted by oxidation to either a sodium thiosulfate, sodium-sulfite or to sodium sulfate, with an efficiency based upon sodium sulfate yield of from about 70 to about 80%. In the absence of pretreatment of the spent caustic in accordance with this invention, the efficiency of a LPWAO operation otherwise the same in terms of temperature, pressure and residence time could be as low as 40 to 50%.

As a further aspect of this invention, the pretreated caustic that has undergone wet air oxidation is thereafter treated in an ozonolysis unit wherein it is contacted in a vertical contactor with an oxygen/ozone gas mixture. The oxygen/ozone gas mixture may be produced in an ozone generator by silent corona discharge, to yield a gas mixture wherein, based upon oxygen molecule content, from about 3 to about 12 mole percent is ozone compared to oxygen. Preferably, the ozone contactor is a two-section vessel having a bottom liquid accumulator bubble section and a top packed section. The pretreated and wet air oxidized spent caustic is fed to the top packed section while the oxygen/ozone gas mixture is supplied to the bottom bubble section. The bottom bubble section will accumulate a liquid level and hence provide a residence time for liquid therein of a sufficient duration such that residual unoxidized sodium sulfide, sulfite and thiosulfate are further oxidized to sodium sulfate to an extent of 90% conversion of the original sodium sulfide level of the spent caustic. The top packed section of the ozonolysis vessel acts as a liquid-vapor contact filter that provides for further ozone reaction and thereby prevents breakthrough into the vent gases from the contactor of any significant levels of ozone.

Oxidized caustic from the ozone contactor will typically contain from about 1 to about 2wt % sodium hydroxide and from about 4 to about 5wt % sodium carbonate and will exist at a pH greater than 13. Before discharge to a waste water system, the pH of this oxidized caustic stream must be reduced to a level of or less than 9.0 pH. As a further aspect of this invention, the oxidized caustic is subjected to progressive pH neutralization through multiple stages in order to avoid excess acid consumption and/or acid overdosing. In multi-stage neutralization two or three stirred tank reactors are employed in series, each with provision for proportional reagent addition which is controlled by software resident in a central programmable logic controller (PLC). The control system simplifies proportional pH neutralization by dividing the pH curve into 4 distinct control sectors such as pH above 12, pH between 11 and 12, pH between 9 and 11, and pH less than 9. Reagent feed devices are provided and designed to function only within the dedicated control range. When utilizing a recirculated feed loop, the control system will provide one feed control valve for each dedicated control range sector. These valves are mechanically sized to provide the reagent flow requirements necessary within the designed control range. The valves are fixed feed rate valves that are activated automatically by the PLC for specific time durations, based upon the pH in the stirred tank reactor. The activation durations are proportional to pH, thus providing the effective control required by the system. After activation of a feed valve, the PLC provides a short time delay between subsequent valve actuation, thus allowing the effect of the progressive addition to be completely realized by the pH control loop. This provides efficient use of reagents and also contributes to improved control characteristics. A neutralization system is designed to proportionally control the neutralization of alkaline waste liquid on a continuous basis. The pH is lowered by adding sulfuric acid and/or increased by reducing the addition of sulfuric acid. The stirred tank reactors are sized to provide a 12 to 15 minute residence time at peak flow rates.

Practice of this invention with respect to the steps of spent caustic pretreatment, wet air oxidation of pretreated spent caustic, ozonolysis of oxidized spent caustic followed by multi-stage pH neutralization provides a final treated caustic stream which has an over 95% reduction in its chemical oxygen demand. The pretreatment step greatly reduces foaming of the so-pretreated spent caustic and fouling of the downstream operations and also enhances the efficiency of wet air oxidation which permits then of an economically feasible polish off by ozonalysis. Multi-stage neutralization of the completely oxidized spent caustic provides for greater economy of neutralization while lessening the dangers of over- or under-dosing the oxidized spent caustic and lessens the likelihood of formation of toxic gases during neutralization.

Figure 3:
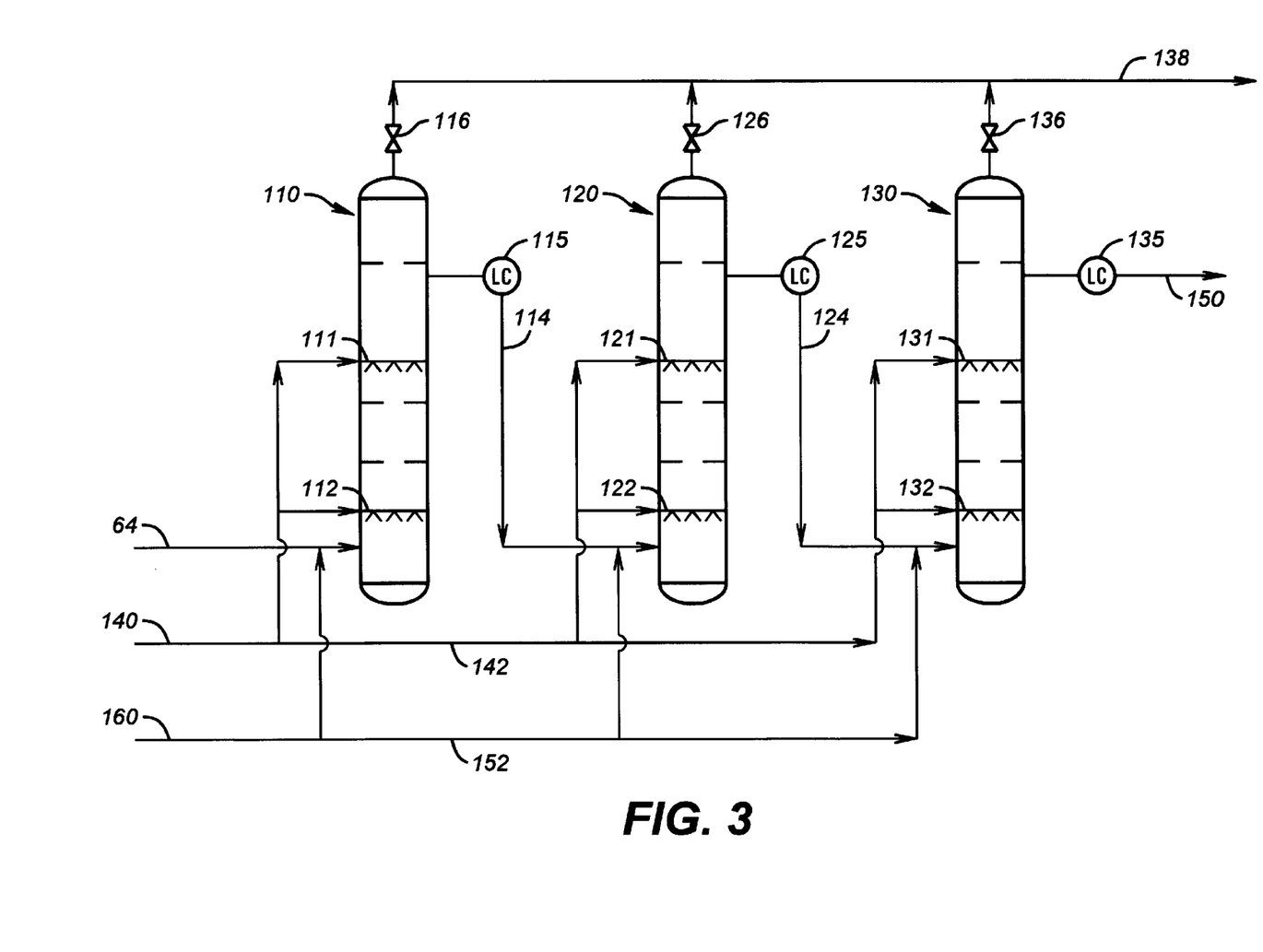
FIG. 3 is a schematic illustration of a wet air oxidation process wherein pretreated spent caustic (as produced by the process steps illustrated in either of FIGS. 1 or 2) is processed through a wet air oxidation unit (illustrated as a series of three WAO reactors) and thereafter is ready for passage to an ozone contactor.

FIG. 3 illustrates a series of three wet air oxidation reactors, 110, 120 and 130 for oxidizing pretreated spent caustic 62 which is delivered via line 64 to the bottom of reactor 110. Each reactor comprises a vertical column internally located within which are sintered metal air spargers at bottom and mid-column level, namely 111, 112 for column 110; 121 and 122 for column 120 and 131 and 132 for column 130. Also internal of each WAO column are a series of baffle plates as illustrated (but not numbered). Compressed air 140 is provided by an appropriate manifold system 142 under valve control (not illustrated) for supply to the air spargers of each WAO column. Process steam 160 is provided through a manifold system 162 under valve control (not illustrated) to the preheated spent caustic in line 64 to heat the caustic stream to the desired reaction temperature. Process steam 160 may be provided to a caustic stream takeoff 114 which is withdrawn from reactor 110 using a level controller 115 and fed to the bottom section of WAO reactor 120. Process steam may also be provided to a caustic stream takeoff 124 which is withdrawn from reactor 120 using a level controller 125 and fed to the bottom section of WAO reactor 130. Overhead gases from each WAO reactor are vented under valve control, respectively, by pressure valve controlled lines 116, 126 and 136 to off gas manifold line 138. A caustic stream takeoff 150 is withdrawn from reactor 130 using a level controller 135 and fed to an ozonolysis reactor as illustrated in FIG. 4.

Figure 4:
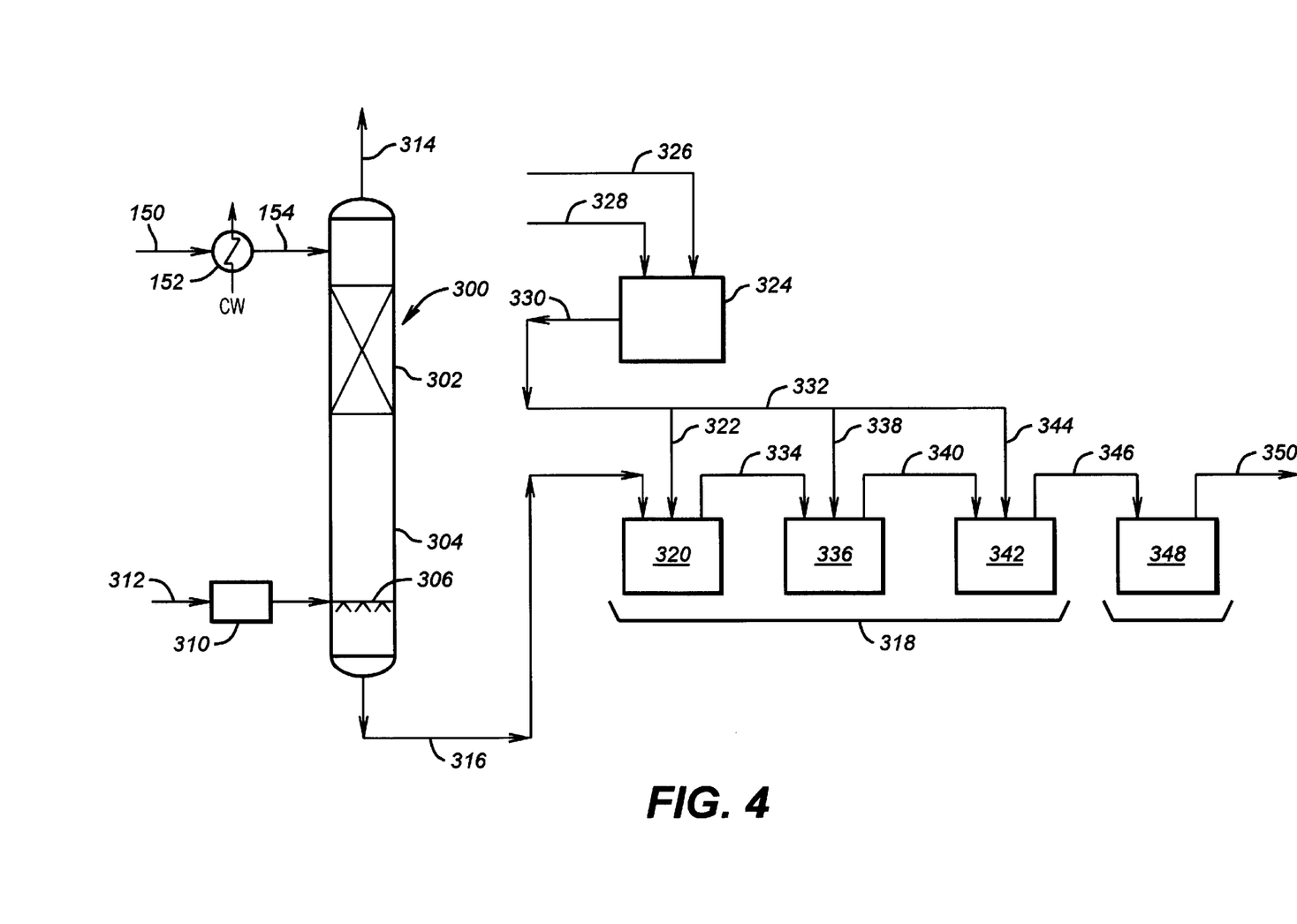
FIG. 4 is a schematic illustration of an ozone contactor to which a pretreated and wet air oxidized caustic stream is fed for enhanced oxidation after which the enhanced oxidized caustic stream is subjected to multiple stage neutralization wherein its pH is stepwise reduced in a controlled manner over time by addition and admixture with controlled portions of an acid reagent to a final pH value of below 9.5 and preferably between 8.5 and 9.0.

FIG. 4 illustrates the further oxidation of the wet air oxidized pretreated spent caustic 150 from the WAO operation by ozonolysis in contactor 300 which comprises a top packed section 302 and a bottom liquid accumulator bubble section 304 having internal thereof a gas distributor 306 to which an oxygen/ozone gas mixture 308 is supplied under appropriate regulation. The oxygen/ozone gas mixture is formed by ozone generator 310 to which a source of oxygen containing gas 312 is supplied. The pretreated and wet air oxidized spent caustic in line 150 is passed through heat exchanger 152 to reduce its temperature to a range of from about 130° C. to about 50° C. and then passed by line 154 to the top section of contactor 300 while oxygen/ozone is supplied by line 308 to the bottom section of contactor 300.

Hence, that caustic solution which is most oxidizable contacts the gases most depleted in ozone in the packed top section of contactor 300 to further react with and act as a filter against ozone breakthrough to contactor vent gases 314 while a level of caustic solution accumulates in the bottom section 304 to undergo a prolonged contact with bubbled ozone to maximize oxidation efficiency.

An oxidized caustic solution 316 is taken from the contactor 300 and fed to a multistage neutralization unit 318. Oxidized caustic solution 316 is fed to a first neutralization reactor 320 to which a 20% acid reactant is added via line 322. The 20% acid reactant is made in a acid reactant tank 324 to which a 98% sulfuric acid solution 326 and water 328 are added. The 98% sulfuric acid 326 and the water 328 are proportioned to yield a 20% acid solution in acid reactant tank 324. The 20% acid solution is withdrawn from acid reactant tank 324 via a line 330 and delivered to a header 332.

First reactor 320 is a stirred tank reactor for a first step in a progressive stage-wise reduction in pH. By manipulating the flow of the 20% acid solution through line 322, pH is controlled in first reactor 320. A first partially-neutralized solution is withdrawn through a line 334 and fed to a second reactor 336, which provides a second step for progressively reducing pH. The 20% acid solution is fed to second reactor 336 via a line 338 for pH control in second reactor 336. The pH of the caustic solution is progressively reduced. A second partially neutralized caustic solution is withdrawn from second reactor 336 and fed via a line 340 to a third reactor 342. The 20% acid solution in header 332 is fed to third reactor 342 via a line 344. The pH in third reactor 342 is controlled by manipulating the flow of 20% acid reactant through line 344 to a final pH value in the range of 8.5 to 9.0. Second reactor 336 and third reactor 342 are also stirred tank reactors. A neutralized solution having a pH in the range of 8.5 to 9.0 is withdrawn from third reactor 342 through a line 346 and fed to a buffer storage tank 348. The volume of buffer storage tank 348 is sufficient for the volume of solution in buffer storage tank 348 to neutralize any minor swings in pH value in the neutralized solution in line 346. A neutralized and buffered stream is withdrawn from buffer storage tank 348 and fed to a wastewater treatment system (not shown) via a line 350. The neutralized and buffered solution in line 350 also has a pH value in a range of 8.5 to 9.0.

The Examples which follow illustrate a practice of the method of this invention and its comparison to certain aspects of prior practices of spent caustic treatment. Example 1 is a comparative example which illustrates the effect upon diene extraction of ambient temperature contact of a spent caustic solution with hydrogenated gasoline as an extraction solvent. Examples 2 and 3 illustrate a practice of this invention of elevated temperature contact of the same spent caustic and hydrogenated gasoline extraction solvent with respect particularly to diene extraction. Examples 4–6 illustrate a practice of this invention of elevated temperature multiple contacts of a spent caustic and toluene as an extraction solvent with respect to diene extraction to provide a spent caustic raffinate that may then readily be steam distilled as in Example 6 without concern for polymer fouling of the distillation unit. Example 7 illustrates the stream composition that results from a treatment of a spent caustic through a sequence of pretreatment followed by wet air oxidation followed by an ozone polish followed by multistage neutralization.

EXAMPLE 1

A spent caustic solution obtained as a blowdown sample from a commercially operated caustic scrubber tower from an ethylene production unit was utilized in an extraction shake test by contacting it with a solvent composition comprising 56 wt % benzene, 17 wt % toluene, 18 wt % other aromatics and with a balance of normal paraffins. The spent caustic solution was analyzed and had a 384 ppm diene content and a density of 1.173 g/cc. Density of the extraction solvent was 0.861 g/cc.

In a successive mix shake contact at 27° C. of 2:1 solvent-spent caustic V/V at 120 sec shake contact followed by 120 sec of settling time, the following results were observed:

|  | Diene Content ppm | % Initial Diene Content |
| --- | --- | --- |
| Precontacted spent caustic | 384 | 100 |
| Raffinate-1 | 289 | 75 |
| Raffinate-2 | 273 | 71 |
| Raffinate-3 | 238 | 62 |

EXAMPLE 2

The procedure of Example No. 1 was repeated except in this case the temperature of both fluids at the time of contact shake mixing was 40° C.

|  | Diene Content ppm | % Initial Diene Content |
| --- | --- | --- |
| Precontacted spent caustic | 384 | 100 |
| Raffinate-1 | 308 | 80 |
| Raffinate-2 | 215 | 56 |
| Raffinate-3 | 176 | 46 |
| Raffinate-4 | 124 | 32 |
| Raffinate-5 | 114 | 30 |
| Raffinate-6 | 113 | 29 |

EXAMPLE 3

The procedure of Example 1 was repeated except in this case the temperature of both fluids at the time of contact shake mixing was 70° C.

|  | Diene Content ppm | % Initial Diene Content |
| --- | --- | --- |
| Precontacted spent caustic | 384 | 100 |
| Raffinate-1 | 95 | 25 |
| Raffinate-2 | 85 | 22 |
| Raffinate-3 | 56 | 15 |
| Raffinate-4 | 42 | 11 |
| Raffinate-5 | 34 | 9 |
| Raffinate-6 | 14 | 3.6 |

EXAMPLE 4

A spent caustic solution obtained from a commercial facility was utilized in extraction shake test with toluene as a solvent. The spent caustic solution had a diene content of 574 ppm and was of a density of 1.01 g/cc. Both fluids were at 80° C. at the time of contact. The table below tabulates the quantity of initial diene content in the caustic as a result of each contact step.

|  | Diene Content ppm | % Initial Diene Content |
|---|---|---|
| Precontacted spent caustic | 574 | 100 |
| Raffinate-1 | 145 | 25 |
| Raffinate-2 | 133 | 23 |
| Raffinate-3 | 78 | 14 |
| Raffinate-4 | 30 | 5.2 |
| Raffinate-5 | 10 | 1.7 |

EXAMPLE 5

The spent caustic solution of Example 4 was subject to a continuous pilot plant extraction test with a 3" dia.×54 stage Scheibel Column with a 2:1 feed of toluene to spent caustic feeds at temperature of 70–80° C. and column agitation speeds of 300 or 400 rpm. In the caustic raffinate from the column diene content was reduced to 30 ppm.

EXAMPLE 6

Caustic raffinate as produced by the procedure of Example 5 was steam stripped with a 3" diameter column containing 24 cartridge sieve trays. The caustic raffinate column feed contained 30 ppm diene content and 280 ppm toluene content. A superheated steam to caustic raffinate feed mass ratio of 0.26 was employed. The treated caustic column bottom take-off stream contained less than 5 ppm diene content and less than 5 ppm toluene content. Inspection of the column trays following distillation revealed no indication of any polymer build-up.

EXAMPLE 7

This example is provided as a projection of the flow rates, constituent make-up, and the temperature, pressure, density, viscosity and other properties of streams of typical volumes in a commercial operation, starting with a drum deoiled spent caustic stream as may be produced during normal operations of an ethylene production unit, that would result from a practice of the principal steps of the process of this invention. Table I below reports the stream composition and conditions thereof as would result, with stream reference numbers corresponding to the reference numbers of FIGS. 1–4.

Table of Example 7
CASE: 90% Comversion to $Na_2SO_4$

|  | Units | 12 Deoiled Feed | 42 Extracted Spent | 62 Stripped Spent | 150 WAO Reactor Efflu. | 316 Ozonator Efflu. | 350 Bio-WWT Feed |
|---|---|---|---|---|---|---|---|
| Flow rate | kg/hr | 1608 | 1625.1 | 1633.9 | 1575.1 | 1577.6 | 1611.4 |
| Flow rate | m3/hr | 1.44 | 1.50 | 1.56 | 1.50 | 1.43 | 1.47 |
| Flow rate | gpm | 6.4 | 6.6 | 6.8 | 6.6 | 6.3 | 6.4 |
| $Na_2S$ | mg/l | 20260 | 19452 | 18810 | 80 | 0 | 0 |
| $Na_2S_2O_3$ | mg/l | 0 | 0 | 0 | 3606 | 1046 | 1019 |
| $Na_2SO_3$ | mg/l | 0 | 0 | 0 | 3413 | 976 | 951 |
| $Na_2SO_4$ | mg/l | 0 | 0 | 0 | 25045 | 34131 | 64243 |
| NaOH | mg/l | 17249 | 16561 | 16014 | 18439 | 17906 | 0 |
| $Na_2CO_3$ | mg/l | 63887 | 61340 | 59315 | 61529 | 64357 | 62721 |
| NaCl | mg/l | 29 | 28 | 27 | 28 | 29 | 29 |
| Acetaldehyde | mg/l | 50 | 7.6 | 0 | 0 | 0 | 0 |
| Methylethyl ketone | mg/l | 50 | 1.3 | 0 | 0 | 0 | 0 |
| Vinylacetate | mg/l | 500 | 0 | 0 | 0 | 0 | 0 |
| Butadiene | mg/l | 500 | 0 | 0 | 0 | 0 | 0 |
| Cyclopentadiene | mg/l | 500 | 0 | 0 | 0 | 0 | 0 |
| Total Aliphatics | mg/l | 1600 | 9 | 1 | 0 | 0 | 0 |
| Phenol | mg/l | 200 | 71 | 31 | 15 | 1 | 1 |
| Benzene | mg/l | 367 | 1531 | 0 | 0 | 0 | 0 |
| Toluene | mg/l | 320 | 87 | 3 | 3 | 0 | 0 |
| Total Aromatics | mg/l | 887 | 1689 | 34 | 16 | 1 | 1 |
| COD | mg/l | 23097 | 21024 | 15513 | 1564 | 424 | 413 |
| BOD | mg/l | 6929 | 6307 | 4654 | 469 | 127 | 124 |
| TDS (Total Dissolved Solids) | mg/l | 102425 | 97382 | 94167 | 112141 | 118445 | 128963 |
| Temp | ° C. | 10 | 81.3 | 118.4 | 130 | 40 | 50 |
| Pressure (absolute) | kg/cm² | 2.4 | 2.4 | 1.9 | 5.4 | 1.4 | 2.1 |
| Density | kg/m3 | 1113 | 1080 | 1050 | 1050 | 1100 | 1095 |
| Viscosity | cp | 2.6 | 0.69 | 0.4 | 0.25 | 0.6 | 0.6 |
| Surface tension | dyne/cm | 80 | 68.5 | 62 | 60 | 70 | 70 |
| pH |  | 13.63 | 13.62 | 13.60 | 13.66 | 13.65 | 8.4 |

Although the invention has been described by reference to its preferred embodiments, those of ordinary skill in the art upon reading this description may appreciate changes and modifications that may be made which do not depart from the scope and spirit of the invention as described above or claimed hereafter.

What is claimed is:

1. A process for treating a spent caustic stream, comprising:
   (a) feeding the spent caustic stream to a multi-stage countercurrent liquid-liquid extractor, the extractor having an upper end and a lower end, the spent caustic being introduced proximate to the upper end;
   (b) feeding a solvent stream to the lower end of the extractor;

(c) withdrawing a spent caustic raffinate stream from the lower end of the extractor;

(d) distilling the spent caustic raffinate stream in a steam distillation unit to provide a pretreated spent caustic stream, (e) subjecting the pretreated spent caustic stream to wet air oxidation to produce an oxidized spent caustic stream containing sodium sulfate, and (f) contacting the oxidized spent caustic stream with an oxygen/ozone gas mixture for a time sufficient to produce a further quantity of sodium sulfate.

2. The process of claim 1, further comprising withdrawing a spent solvent extract stream from the upper end of the extractor and regenerating the solvent extract stream in a solvent regenerator, the solvent regenerator being a distillation tower, the solvent extract stream being fed to the solvent regenerator, wherein a light overhead stream is purged, a heavy bottom stream is purged, and a heart-cut side stream is recycled into the solvent stream fed to the extractor.

3. The process of claim 2, further comprising adding a fresh solvent make-up stream to the solvent stream for offsetting solvent losses.

4. The process of claim 1, wherein the extractor comprises a multi-stage countercurrent agitated contactor.

5. The process of claim 1, wherein the spent caustic raffinate stream contains less than 50 parts per million dissolved organics and less than 20 ppm diolefins.

6. The process of claim 1, including heating the spent caustic stream before feeding it to the extractor to a temperature of 35 to 70° C.

7. The process of claim 6, including heating the solvent stream before feeding it to the extractor or a temperature of 50 to 100° C.

8. The process of claim 1, including purging organic material from the spent caustic raffinate stream as an overhead stream from the steam distillation unit.

9. The process of claim 8, including regenerating the solvent extract stream in a solvent regenerator to produce a solvent recycle stream.

10. The process of claim 1, wherein said solvent is an organics stream of greater that 50 weight percent aromatic hydrocarbon content.

11. The process of claim 10, wherein said aromatic hydrocarbon comprises benzene, toluene or xylenes.

12. The process of claim 1, wherein said solvent is toluene.

13. The process of claim 1, wherein said pretreated spent caustic stream is wet air oxidized to an extent of 70 to 80% conversion of the spent caustic stream content of sodium sulfide to sodium sulfate.

14. The process of claim 1, wherein said oxidized spent caustic stream is contacted with oxygen/ozone for a time sufficient to further oxidize sodium sulfide, sulfite and thiosulfate to sodium sulfate to an extent of 90% conversion based upon sodium sulfide content of said spent caustic.

15. The process of claim 14, wherein that caustic stream emerging from contact with oxygen/ozone has a COD which is 5% of the spent caustic stream COD value.

* * * * *